May 29, 1956     C. A. DAMM ET AL     2,747,954
HYDRAULIC PACKING
Filed Aug. 5, 1953
Fig. 1
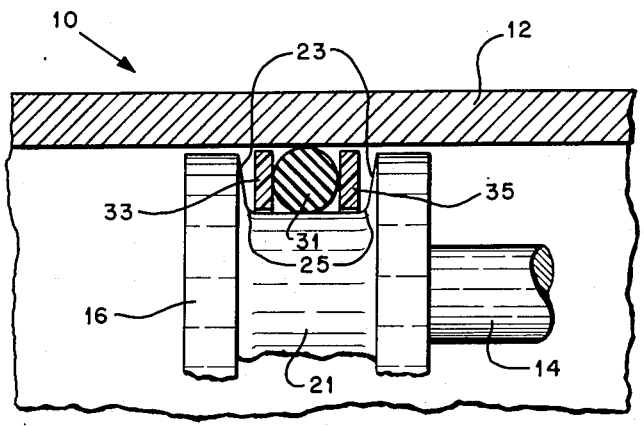
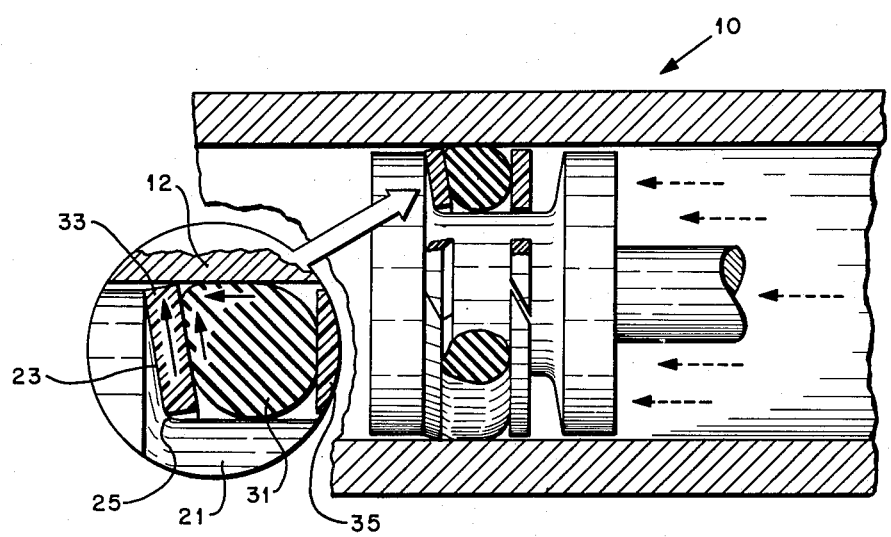
Fig. 2
INVENTORS
CARL A. DAMM
WILLIAM PARASKEWIK
BY
ATTORNEYS

United States Patent Office 2,747,954
Patented May 29, 1956

2,747,954

HYDRAULIC PACKING

Carl A. Damm, Upper Black Eddy, and William Paraskewik, Lansdale, Pa.

Application August 5, 1953, Serial No. 372,613

6 Claims. (Cl. 309—23)

(Granted under Title 35, U. S. Code (1952), sec. 266)

The invention described herein may be manufactured and used by or for the Government of the United States of America for governmental purposes without the payment of any royalties thereon or therefor.

This invention relates to hydraulic packing and more particularly to hydraulic packing including a novel sealing means capable of operation under extremely high pressures with low friction drag.

There are numerous different sealing means used as hydraulic packing between the piston and the cylinder wall of hydraulic cylinder assemblies. However, all known types of sealing means used for this purpose are increasingly subject to failure as the hydraulic pressure to which they are subjected is increased. In fact, such failures invariably occur at pressures far less than 10,000 lbs. per square inch. In a previous attempt to provide a hydraulic packing capable of withstanding substantially increased hydraulic pressures, a specially designed V cup packing was used. This special packing was successfully operated at substantially increased hydraulic pressures. However, it was a very expensive packing, since it could only be fabricated in special molding dies. In addition, the V cup packing had several other limiting characteristics. With this packing installed, a hydraulic cylinder had to be operated with great care, since a quick reversal of loads could pinch the packing, resulting in its destruction. Moreover, a hydraulic cylinder in which this packing was incorporated had to be positioned very carefully when it was installed. Finally, the useful life of this packing was extremely short.

The present invention provides a hydraulic packing which overcomes the pressure limitation of the various known types of hydraulic packing and avoids the undesirable characteristics of the V cup packing enumerated above.

This invention contemplates the use of a conventional O ring mounted between interchangeable back-up and follow-up rings having special significant characteristics. All three rings are mounted in a specially designed annular groove in the circumferential outer surface of the piston in a hydraulic cylinder assembly. Due to the novel cooperation between the back-up ring and the groove, described in detail below, the instant invention provides sealing means effective to withstand extremely high hydraulic pressures ranging upwardly from 10,000 lbs. per square inch. The back-up ring is so disposed under pressure that it moves along the cylinder wall with a minimum of friction drag. Hence, it is possible to accurately calibrate a hydraulic cylinder incorporating the instant invention for operation under pressures in excess of 10,000 lbs. per square inch.

An object of the present invention is the provision of a hydraulic packing for use in hydraulic cylinder assemblies subjected to extremely high operating pressures.

Another object is to provide a hydraulic packing in which the possibility of excessive distortion or localized destruction of the various elements of the packing is minimized.

A further object of the invention is the provision of a hydraulic packing for use in hydraulic cylinder assemblies which is characterized by low friction drag in operation.

Still another object is to provide a hydraulic packing in which the sealing element is highly resistant to wear so that it will operate for extended periods under extremely high pressures.

A final object of the present invention is the provision of a follow-up ring identical to the back-up ring so that the follow-up ring acts as a back-up ring when the direction of application of the hydraulic pressure is reversed, in order to render a hydraulic cylinder assembly in which the instant invention is incorporated double-acting.

The exact nature of this invention as well as other objects and advantages thereof will be readily apparent upon consideration of the following specification along with the annexed drawings in which:

Fig. 1 is a longitudinal sectional view, partly broken away, of a typical hydraulic cylinder assembly in which the instant invention has been incorporated and, Fig. 2 is also a longitudinal sectional view including an enlarged detail showing of the same hydraulic cylinder assembly with the elements of the hydraulic packing in the positions which they assume when hydraulic pressure is applied from the right as seen in Fig. 2.

Referring now to the drawings, wherein like reference numerals designate like or corresponding parts throughout the several views, the showing in Fig. 1 represents a portion of a hydraulic cylinder assembly embodying the instant invention and showing the various elements in the positions which they assume when no hydraulic pressure is applied. The cylinder assembly, generally designated by the reference numeral 10 includes a cylinder 12, a piston rod 14 and a unitary piston 16 mounted on one end of the piston rod 14. The piston 16 is characterized by a circumferential groove 21 in its outer surface having outwardly sloping side walls 23 each terminating at its inner edge in a fillet formed by a small radius 25. This groove 21 is fitted with suitable hydraulic packing including an O ring 31, a back-up ring 33, and a follow-up ring 35 which may be made interchangeable with the back-up ring. The O ring 31 may be of conventional design and be fabricated from any suitable resilient material. On the other hand, the back-up ring 33, and preferably the follow-up ring 35 as well, must be fabricated from material highly resistant to wear and to local distortion and having a low coefficient of friction. The material used may be polytetrafluoroethylene, known commercially as "Teflon", or any other suitable material.

Turning next to a consideration of Fig. 2, this view shows the various elements of the cylinder assembly 10 in the relationship which they assume when hydraulic pressure is applied in the direction indicated by the dotted arrows. In addition, Fig. 2 includes an enlarged detail showing the novel relationship between the O ring, the back-up ring, the side wall of the groove, and the inner surface of the cylinder. With specific reference to the detail showing in Fig. 2, the application of hydraulic pressure will cause the O ring to press against the back-up ring so that the back-up ring is deflected into engagement with the radially sloped side wall 23 of the groove 21. Since the back-up ring is characteristically resistant to local distortion and since it is angularly slit as shown in Fig. 2 to permit radial expansion, the radius forming a camming fillet 25 at the inner edge of the side wall 23 will force the back-up ring radially outward along the sloping side wall and against the inner surface of the cylinder wall 12. With this arrangement, the area of contact between the back-up ring and the cylinder wall is reduced to a sharp edge, providing increased sealing force per unit area and reducing friction drag to a minimum. Moreover, due to the back-up ring's resistance to local distortion its surface is not deformed due to the force exerted by the O ring. Hence, the pressure exerted by the O ring is applied evenly over a relatively wide area adjacent to the outer edge of the back-up ring without any risk of pinching the O ring between the outer edge of the back-up ring and the cylinder wall. In addition, the back-up ring is slit in such a manner that radial expansion of the back-up ring will not produce a gap in which the O ring might incur local damage.

The camming fillet 25 referred to above and shown in Figs. 1 and 2 of the drawing is not to be confused with or mistaken for the minute curvature which may be characterized as a fillet which is customarily provided at the intersecting edge of angularly offset surfaces of machined parts in order to simplify fabrication of such parts and to insure against fatigue failures due to stress concentrations along such edges. Instead, the camming fillets 25, as indicated by the showing in the drawings and in particular in the detailed showing included in Fig 2, is of a substantial radius relative to the depth of the groove 21, so that it is capable of producing sufficient radio displacement of the back-up ring 33 to maintain the desired sealing relationship between said back-up ring and the inner surface of the cylinder wall 12.

This device also includes a follow-up ring preferably identical to and interchangeable with the back-up ring. The follow-up ring is effective to prevent excessive rolling of the O ring, it excludes foreign matter from the piston groove, and it can be reversed with the back-up ring in the event the latter becomes badly worn. In addition, the follow-up ring is so disposed adjacent to opposite sidewall that it acts as the back-up ring if the direction in which the hydraulic pressure is applied is reversed. Thus, with this device, the provision of double acting operation in a hydraulic cylinder assembly is facilitated.

The present invention provides a substantially improved hydraulic packing especially adapted for use in hydraulic cylinder assemblies, which is effective under very high hydraulic pressures over extended periods of operation. Moreover, the low friction drag characteristic of the instant invention renders it especially desirable for use in precision operations, where the hydraulic cylinder assembly must be accurately calibrated over a wide range of pressures, for example, for use as a jack in conducting static load tests.

It should be understood, of course, that the foregoing disclosure relates particularly to a preferred embodiment of the invention and that numerous modifications or alterations may be made therein without departing from the spirit and scope of the invention as set forth in the appended claims.

What is claimed is:

1. A fluid seal for use between two closely spaced relatively sliding surfaces including a groove in one surface extending transversely of the direction of relative motion and generally trapezoidal in cross section with side walls diverging from a relatively narrow bottom to a relatively wide opening and substantial arcuately curved camming means between the bottom and the respective side walls, a strip composed of a resilient material and circular in cross section extending longitudinally along the groove, a first flat elongated member highly resistant to local distortion and rectangular in cross section disposed edgewise in the groove adjacent to one side of the strip of resilient material and a second flat elongated member rectangular in cross section and disposed edgewise in the groove adjacent the other side of the strip of resilient material, whereby fluid pressure applied in the direction of relative movement by-passes the second member and distorts the strip of resilient material, which in turn exerts a uniformly distributed pressure upon the first member, forcing this member against the sloped side wall and up on the substantial arcuately curved camming means so that one edge of the member is forced into continuous engagement with the second relatively sliding surface by the camming action of said fillet on the diagonally opposed edge of said first member as it is forced against the sloped side wall of the groove.

2. A device as described in claim 1, in which the first elongated member and the second elongated member are identical, whereby said device will continue to be effective as a fluid seal when the direction in which the fluid pressure is applied is reversed.

3. A fluid seal arranged to move slidably within a cylindrical chamber, said seal comprising a body having a generally cylindrical outer surface, an annular grooved channel in the surface, the side walls of the channel being sloped at an angle of from about 95° to about 105° with respect to the base of the channel and each being connected to the base of the channel by a continuously extending fillet consisting of a substantial radially curved camming surface, a pair of flat rings each highly resistant to local distortion and having a slit extending radially of the ring and diagonally between its opposite flats and both positioned within the channel, and a resilient O ring positioned within the channel and between the flat rings.

4. A fluid seal designed for sliding movement within a cylindrical chamber, said seal comprising a generally cylindrical body having an annular groove extending around its circular outer surface, said groove having a flat bottom concentric with the circular surface of said body, side walls mutually slightly diverging radially from the bottom to the surface, and camming fillets of a substantial predetermined radius defining arcuately curved camming surfaces interconnecting the edges of the bottom and the inner edges of the side walls, an O ring circular in cross section and composed of resilient material disposed in the groove; a first flat slit ring rectangular in cross section and highly resistant to local distortion disposed in the groove on one side of the O ring, and a second flat slit ring rectangular in cross section and disposed in the groove on the other side of the O ring, whereby the force exerted by hydraulic fluid upon the O ring and transmitted therethrough to the first flat ring presses said ring against the adjacent sloping side wall of the groove and shifts an inner edge of said ring radially outward by means of said camming fillet at the inner edge of the side wall so that an outer edge of said ring is brought into sealing engagement with the circumferential surface of a cylindrical chamber as said ring is pressed against said side wall.

5. A device as described in claim 4, in which the second flat ring is identical to the first flat ring including being highly resistant to local distortion, whereby application of hydraulic pressure to the O ring from either direction causes one of the flat rings to shift into sealing engagement with the circumferential surface of a cylindrical chamber.

6. A device as described in claim 5 in which each said flat ring is provided with a slit extending radially of the ring and diagonally between its opposite sides, whereby provision is made for radial expansion of said flat rings and simultaneous lateral deflection of the outer periphery thereof into engagement with a radially sloped side wall without loss of sealing engagement and without presenting a discontinuous face to the adjacent surface of said O ring.

References Cited in the file of this patent

UNITED STATES PATENTS

| Number | Name | Date |
|---|---|---|
| 164,444 | Grilley | June 15, 1875 |
| 2,349,170 | Jackman | May 16, 1944 |
| 2,437,814 | Hallen | Mar. 16, 1948 |
| 2,462,586 | Whittingham | Feb. 22, 1949 |